United States Patent [19]

Grabarse et al.

[11] Patent Number: 5,741,345
[45] Date of Patent: Apr. 21, 1998

[54] COMBINATION OF ACTIVE INGREDIENTS FOR INHIBITING OR CONTROLLING AMMONIA NITRIFICATION IN ARABLE TOPSOIL AND SUBSOIL

[75] Inventors: Margrit Grabarse, Seelingstädt; Sieghard Lang, Cunnersdorf; Hans-Jürgen Michel, Machern; Hartmut Wozniak, Cunnersdorf, all of Germany

[73] Assignee: SKW Stickstoffwerke Piesteritz GmbH, Lutherstadt Wittenberg, Germany

[21] Appl. No.: 693,142

[22] PCT Filed: Feb. 20, 1995

[86] PCT No.: PCT/DE95/00243

§ 371 Date: Aug. 13, 1996

§ 102(e) Date: Aug. 13, 1996

[87] PCT Pub. No.: WO95/22514

PCT Pub. Date: Aug. 24, 1995

[30] Foreign Application Priority Data

Feb. 21, 1994 [DE] Germany .................. 44 05 393.2

[51] Int. Cl.⁶ .................................................. C05C 13/00
[52] U.S. Cl. .................. 71/11; 71/29; 71/30; 71/902; 71/903; 71/27
[58] Field of Search ................... 71/11, 28–30, 71/902, 903

[56] References Cited

U.S. PATENT DOCUMENTS

| | | | |
|---|---|---|---|
| 4,523,940 | 6/1985 | Arndt et al. | 71/11 |
| 5,261,939 | 11/1993 | Solansky et al. | 71/29 |

FOREIGN PATENT DOCUMENTS

| | | | |
|---|---|---|---|
| A 0 289 757 | 11/1988 | European Pat. Off. | |
| 0222471 | 5/1985 | Germany | 71/902 |
| A 227957 | 10/1985 | Germany | |
| 0230863 | 12/1985 | Germany | 71/902 |
| 93 21134 | 10/1993 | WIPO | |

*Primary Examiner*—Ferris Lander
*Attorney, Agent, or Firm*—Henry M. Feiereisen

[57] ABSTRACT

This patent describes nitrification inhibitors characterized by the fact that they contain as their active ingredients a substituted pyrazole, or a salt or metallic complex thereof, dicyanodiamide, and one of the compounds ammonium thiosulfate, biguanide, or ammonium rhodanide. The combinations of the present invention are more efficacious than the individual ingredients alone and binary combinations of the same ingredients, and are thus superior to same from the ecological, phytotoxicity, and cost-effectiveness stand-points, as well as in terms of their tendencies to form undesirable residues.

6 Claims, No Drawings

COMBINATION OF ACTIVE INGREDIENTS FOR INHIBITING OR CONTROLLING AMMONIA NITRIFICATION IN ARABLE TOPSOIL AND SUBSOIL

BACKGROUND OF THE INVENTION

This application is a 371 of PCT/DE95/00243 filed Feb. 20, 1995.

The present invention concerns combinations of active ingredients for inhibiting or controlling nitrification of ammonia in arable topsoil and subsoil. It is known that ammonia and ammonium compounds in soil are rapidly oxidized by bacterial action to form nitrites in intermediate stages, and ultimately to nitrates. Nitrate ions cannot be sorbed by the sorbing agents present in soil, and may thus be washed out, and cause eutrophication of ground water and surface runoff.

On the other hand, high concentrations of nitrites and nitrates in soil frequently lead to toxicologically questionable levels of nitrate enrichment in plants. Moreover, denitrification (chemical and bacterial reduction of nitrates in soil), particularly under anaerobic conditions, depletes nitrogen by reducing nitrates formed by nitrification processes to gaseous nitrogen compounds, largely nitrous oxide, which then escape and pollute the atmosphere.

It is also known that certain chemicals inhibit bacterial oxidation. For example, it has been proposed that substituted pyrazoles (U.S. Pat. No. 3,494,757, DD 133088), their salts (U.S. Pat. No. 367,735,690, JP 7247182), and other compounds, such as dicyanodiamide (DE 2702284, DE 2714601), guanyl thiocarbamide (JP 7301138), nitrapyrine (U.S. 3,424,754, SU 1085966), and thiadiazole (JP 730704, JP 7204964) be employed as nitrification inhibitors.

Combinations of active ingredients, such as pyrazole and dicyanodiamide (DD 222471), pyrazole and guanyl thiocarbamide (DD 247894), and dicyanodiamide and ammonium thiosulfate (DE 3714729), are known to inhibit nitrification.

These known compounds and combinations suffer from various types of problems. For some, the problem is their efficacies are too low or that the required dosages are extremely large, which may often lead to phytotoxicity occurring in cultivated plants, or to problems with residues in plants, particularly those having short vegetative cycles. High volatilities and low migration rates are frequently the cause of low efficacies and high levels of environmental pollution.

SUMMARY OF THE INVENTION

The object of the present invention is identifying new combinations of active ingredients that do not suffer from these problems. In particular, the combinations of the present invention should be more effective and less expensive, and should have better behaviors in relation to residues and effectively eliminate phytotoxicity effects, due to dosages being much lower than if their active ingredients were employed alone.

Surprisingly, it has been found that combinations containing as their active ingredients
a) at least one substituted pyrazole (P), or a salt or metallic complex thereof,
b) dicyanodiamide (DCD), plus
c) at least one of the compounds (X)
   ammonium thiosulfate,
   biguanide, or
   ammonium rhodanide, give rise to strong synergetic effects on nitrification in amble topsoil and subsoil when applied jointly, and produce much better results than binary combinations of the same active ingredients (cf. Table 8), which, in turn, result in better potential utilization of the nitrogen of nitrogen fertilizers present in soil by plants, as well as better biomass yields.

The combinations of the present invention are ecologically superior and more cost effective.

They may be employed in mixing ratios ranging from 99:1 to 1:99 (DCD:X) and 75:1 to 1:1 [(DCD+X):P].

They are preferentially applied in the form of suitably formulated solutions, suspensions, sprayable powders, or emulsion concentrates, either alone or in conjunction with solid or liquid, mineral or organic, amide and/or ammonia, fertilizers.

The combinations of the present invention may be applied prior to, along with, or subsequent to, fertilizers, and may or may not be applied in conjunction with other agrochemicals, such as herbicides, pesticides, growth regulators, or soft improvers, or with other agricultural measures.

PREFERRED EMBODIMENTS OF THE INVENTION

The following examples will serve to clarify the present invention, but shall not be construed as delimiting or imposing any restrictions on same.

EXAMPLES

The efficacies of the ternary combinations of active ingredients of the present invention were investigated in a series of model studies conducted on soil samples and compared with results obtained for binary combinations of the same ingredients.

Analytical Procedures Employed for Quantifying Nitrification-Inhibition Efficacies Sets of 100 g samples of air-dried soil (sandy loam with a pH of 6.1, an organic content of 1.19%, and a T of 5.0 mval/100 g of soil) that had been passed through a 2-mm sieve were prepared by adding 10 mg of nitrogen in the form of ammonium sulfate and the various proportions of active ingredients. The samples were then thoroughly mixed, brought up to 50% of their moisture-retention capacities, and transferred to 250-ml plastic bottles, which were sealed with thin polyethylene foil and incubated in an air-conditioned darkroom at temperatures of 20° C.±2° C.

Samples for analysis, consisting of 5.75 g of soil (5 g air-dried weight), were withdrawn at intervals of seven days and their nitrogen contents extracted by adding 50 ml of a normal solution of KCl and then shaking them for one hour in an overhead shaker. The resultant extracts were suitably prepared and their nitrogen ($NH_4$ and $NO_3$) contents determined using an ADM 300 automatic analyzer.

Percentage nitrification inhibitions were then computed from the relation $$\text{percentage nitrification inhibition} = \frac{K-A}{K-B} \times 100,$$

where
K is the nitrate concentration in soil samples admixed with nitrogen fertilizer, but no active ingredients,
A is the nitrate concentration in soil samples admixed with both nitrogen fertilizer and active ingredients, and
B is the nitrate concentration in soil samples that had no nitrogen fertilizer or active ingredients added.

Concentrations and Mixing Ratios Employed

Total concentrations of the active ingredients of the present invention were 3 ppm in all cases. Mixing ratios

[(DCD+X):pyrazole derivative] were held constant at 25:1 while DCD:X proportionings were 4:1, 3:1, 2:1, 1:1, 1:2, 1:3, and 1:4, yielding the following partial concentrations for the active ingredients involved:

TABLE 1

Ternary combinations

| Mixing-Ratio Numerical Code | DCD:X Mixing Ratio | Partial Concentrations [ppm] | | | Total Concentration [ppm] |
|---|---|---|---|---|---|
| | | DCD | X | P | |
| 1 | 4:1 | 2.308 | 0.577 | 0.115 | 3 |
| 2 | 3:1 | 2.163 | 0.721 | 0.115 | 3 |
| 3 | 2:1 | 1.923 | 0.962 | 0.115 | 3 |
| 4 | 1:1 | 1.442 | 1.442 | 0.115 | 3 |
| 5 | 1:2 | 0.962 | 1.923 | 0.115 | 3 |
| 6 | 1:3 | 0.721 | 2.163 | 0.115 | 3 |
| 7 | 1:4 | 0.577 | 2.308 | 0.115 | 3 |

TABLE 2

Binary combinations
All binary combinations had a DCD:X mixing ratio of 1:1. The other mixing ratios involved were the same as those employed for the ternary combinations of the present invention

| Mixing-Ratio Code Symbol | Combination | Partial Concentration [ppm] | Total Concentration [ppm] |
|---|---|---|---|
| 4/1 | DCD + X | 1.442 ± 1.442 | 2.884 |
| 4/2 | DCD + P | 1.442 ± 0.115 | 1.557 |
| 4/3 | X + P | 1.442 ± 0.115 | 1.557 |

TABLE 3

List of active ingredients investigated

| Designation/Chemical Formula | Symbol |
|---|---|
| Dicyanodiamide | DCD |
| Guanyl thiocarbamide | GTH |
| Thiocarbamide | TH |
| Ammoniuim thiosulfate | ATS |
| Ammonium rhodanide | AR |
| 3-methylpyrazole | MP |
| 1-guanyl-3-methylpyrazole x $HNO_3$ | GMP x $NO_3$ |
| [Mn(MP)$_2$)(H$_2$O)]Cl$_2$ manganochloro-methylpyrazole complex | Mn/MP |

Computation and Analysis of the Efficacies of the Combinations Studied

The efficacies of the combinations studied were computed using the technique of Colby (*Weeds* 15 (1967), pp. 20–22), which is based on efficacy complements, E', given by $$E' = 100 - E,$$

where E are the respective efficacies, expressed as percentages. ps Theoretical values of these complements for those combinations whose efficacies, E, are purely additive were computed from the relation $$E = \frac{x_1 y_1 z_1}{100^{n-1}},$$

where $x_1$ is the value of E' for compound A, present in concentration $C_A$.

$y_1$ is the value of E' for compound B, present in concentration $C_B$.

$z_1$ is the value of E' for compound C, present in concentration $C_C$.

n is the total number of active ingredients present in the combination, and $E_T$ is E'$_{true}$, the empirically determined value or E' for the combination involved.

The results of combining ingredients were categorized as follows:

E>$E_T$ implies that there is synergism among the active ingredients,

E<$E_T$ implies that the active ingredients counteract one another, and

E=$E_T$ implies that the efficacies of individual active ingredients are purely additive.

In order to simplify quantifying the results of employing combinations of active ingredients, we computed efficacy factors, EF, given by $$EF = \frac{E_{true}}{E_{theor}},$$

where

EF>1 implies that there is synergism among the active ingredients,

EF<1 implies that the active ingredients counteract one another, and

EF=1 implies that the efficacies of individual active ingredients are purely additive, $E_{true}$=100–$E_T$, and $E_{theor}$=100–E.

Efficacies of Individual Active Ingredients

The efficacies of individual active ingredients were determined from linear regressions applied to sets of four empirically determined data points for the concentration ranges 0.5 ppm–2.5 ppm for DCD and X, and 0.075 ppm–0.5 ppm for the pyrazoles studied.

In the interest of simplicity and clarity, the tables below list only the regression relations and data points employed in computing the efficacies for the various individual active ingredients.

TABLE 4

| Active Ingredient | Regression Relation |
|---|---|
| DCD | y = 5.83 x + 20.44 |
| GTH | y = 10 x – 4.1 |
| TH | ⎫ No effects were discernible |
| ATS | ⎬ 28 days after application |
| AR | ⎭ of the concentrations employed. |
| MP | y = 162.6 x + 17.6 |
| GMP x $NO_3$ | y = 38.1 x + 26.7 |
| Mn/MP | y = 81.7 x + 17.7 |

TABLE 5

| Active Ingredient | Percentage Nitrification Inhibition After 28 Days | | | | | | | |
|---|---|---|---|---|---|---|---|---|
| | 0.115 | 0.577 | 0.721 | 0.962 | 1.442 | 1.923 | 2.163 | 2.308 |
| DCD | — | 23.8 | 24.6 | 26.0 | 28.8 | 31.7 | 33.1 | 33.9 |
| GTH | — | 1.7 | 3.1 | 5.5 | 10.3 | 15.1 | 17.5 | 19.0 |
| TH | — | 0 | 0 | 0 | 0 | 0 | 0 | 0 |

TABLE 5-continued

| Active | Percentage Nitrification Inhibition After 28 Days | | | | | | | |
|---|---|---|---|---|---|---|---|---|
| Ingredient | 0.115 | 0.577 | 0.721 | 0.962 | 1.442 | 1.923 | 2.163 | 2.308 |
| ATS | — | 0 | 0 | 0 | 0 | 0 | 0 | 0 |
| AR | — | 0 | 0 | 0 | 0 | 0 | 0 | 0 |
| MP | 36.3 | — | — | — | — | — | — | — |
| GMP x $NO_3$ | 31.1 | — | — | — | — | — | — | — |
| Mn/MP | 27.1 | — | — | — | — | — | — | — |

TABLE 6

Efficacies of binary combinations 28 days after application

| Combination | $E_{true}$ [%] | E | $E_T$ | EF |
|---|---|---|---|---|
| DCD + GTH | 39.2 | 63.9 | 60.8 | 1.09 |
| DCD + TH | 30.0 | 71.2 | 70.0 | 1.04 |
| DCD + ATS | 29.1 | 71.2 | 70.9 | 1.01 |
| DCD + AR | 26.4 | 71.2 | 73.6 | 0.92 |
| DCD + MP | 69.4 | 45.4 | 30.6 | 1.27 |
| DCD + GMP x $NO_3$ | 67.3 | 49.1 | 32.7 | 1.32 |
| DCD + Mn/MP | 62.4 | 51.9 | 37.6 | 1.30 |
| GTH + MP | 48.1 | 57.1 | 51.9 | 1.12 |
| GTH + GMP x $NO_3$ | 45.8 | 61.8 | 54.2 | 1.20 |
| GTH + Mn/MP | 37.9 | 65.4 | 62.1 | 1.10 |
| TH + MP | 31.9 | 63.7 | 68.1 | 0.88 |
| ATS + MP | 34.7 | 63.7 | 65.3 | 0.96 |
| AR + MP | 35.2 | 63.7 | 64.8 | 0.97 |

TABLE 7

Efficacies of combinations of active ingredients of the present invention

| Combination | DCD:X Mixing Ratio | $E_{true}$ [%] | E | $E_T$ | EF |
|---|---|---|---|---|---|
| DCD + GTH + MP | 1 | 79.9 | 41.4 | 20.1 | 1.36 |
| | 2 | 84.3 | 41.3 | 15.7 | 1.44 |
| | 3 | 82.8 | 41.1 | 17.2 | 1.41 |
| | 4 | 92.1 | 40.7 | 7.9 | 1.55 |
| | 5 | 79.0 | 40.0 | 21.0 | 1.32 |
| | 6 | 78.6 | 39.6 | 21.4 | 1.30 |
| | 7 | 70.3 | 39.3 | 29.7 | 1.16 |
| DCD + TH + MP | 1 | 86.2 | 42.1 | 13.8 | 1.49 |
| | 2 | 85.0 | 42.6 | 15.0 | 1.48 |
| | 3 | 80.2 | 43.5 | 19.8 | 1.42 |
| | 4 | 78.0 | 45.4 | 22.0 | 1.43 |
| | 5 | 72.4 | 47.1 | 27.6 | 1.37 |
| | 6 | 67.9 | 48.0 | 32.1 | 1.31 |
| | 7 | 58.4 | 48.5 | 41.6 | 1.13 |
| DCD + ATS + MP | 1 | 95.6 | 42.1 | 4.4 | 1.65 |
| | 2 | 95.5 | 42.6 | 4.5 | 1.66 |
| | 3 | 95.5 | 43.5 | 4.5 | 1.69 |
| | 4 | 94.1 | 45.4 | 5.9 | 1.72 |
| | 5 | 90.9 | 47.1 | 9.1 | 1.72 |
| | 6 | 83.1 | 48.0 | 16.9 | 1.60 |
| | 7 | 72.2 | 48.5 | 27.8 | 1.40 |
| DCD + AR + MP | 1 | 86.5 | 42.1 | 13.5 | 1.49 |
| | 2 | 84.0 | 42.6 | 16.0 | 1.46 |
| | 3 | 84.5 | 43.5 | 15.5 | 1.50 |
| | 4 | 90.1 | 45.4 | 9.9 | 1.65 |
| | 5 | 72.6 | 47.1 | 27.4 | 1.37 |
| | 6 | 67.9 | 48.0 | 32.1 | 1.31 |
| | 7 | 49.2 | 48.5 | 50.8 | 0.96 |
| DCD + GTH + GMP x $NO_3$ | 1 | 93.7 | 44.8 | 6.3 | 1.70 |
| | 2 | 90.3 | 44.7 | 9.7 | 1.63 |
| | 3 | 91.5 | 44.5 | 8.5 | 1.65 |
| | 4 | 97.0 | 44.0 | 3.0 | 2.20 |
| | 5 | 83.3 | 43.3 | 16.7 | 1.47 |
| | 6 | 79.8 | 42.9 | 20.2 | 1.40 |
| | 7 | 75.1 | 42.5 | 24.9 | 1.31 |
| DCD + GTH + Mn/MP | 1 | 82.4 | 47.4 | 17.6 | 1.57 |
| | 2 | 83.5 | 47.3 | 16.5 | 1.58 |
| | 3 | 78.2 | 47.1 | 21.8 | 1.48 |
| | 4 | 75.1 | 46.6 | 24.9 | 1.41 |
| | 5 | 70.0 | 45.8 | 30.0 | 1.29 |
| | 6 | 58.4 | 45.3 | 41.6 | 1.07 |
| | 7 | 50.3 | 45.0 | 49.7 | 0.91 |

Table 8, below, presents evidence that the multicomponent combinations of the present invention are superior to binary combinations of the same active ingredients.

TABLE 8

A comparison of the efficacies of combinations of the present invention with those of binary combinations of the same active ingredients

| Combination | Mixing Ratio | EF |
|---|---|---|
| DCD + GTH + MP | 4 | 1.55 |
| DCD + GTH | 4/1 | 1.09 |
| DCD + MP | 4/2 | 1.27 |
| GTH + MP | 4/3 | 1.12 |
| DCD + TH + MP | 4 | 1.43 |
| DCD + TH | 4/1 | 1.04 |
| DCD + MP | 4/2 | 1.27 |
| TH + MP | 4/3 | 0.88 |
| DCD + ATS + MP | 4 | 1.72 |
| DCD + ATS | 4/1 | 1.01 |
| DCD + MP | 4/2 | 1.27 |
| ATS + MP | 4/3 | 0.96 |
| DCD + AR + MP | 4 | 1.65 |
| DCD + AR | 4/1 | 0.92 |
| DCD + MP | 4/2 | 1.27 |
| AR + MP | 4/3 | 0.97 |
| DCD + GTH + GMP x $NO_3$ | 4 | 2.20 |
| DCD + GTH | 4/1 | 1.08 |
| DCD + GMP x $NO_3$ | 4/2 | 1.32 |
| GTH + GMP x $NO_3$ | 4/3 | 1.20 |
| DCD + GTH + Mn/MP | 4 | 1.41 |
| DCD + GTH | 4/1 | 1.08 |
| DCD + GMP x $NO_3$ | 4/2 | 1.32 |
| GTH + GMP x $NO_3$ | 4/3 | 1.20 |

We claim:

1. A composition for use in inhibiting and controlling the nitrification of ammonium nitrogen in arable soils and substrates, said composition comprising:

a first compound selected from the group consisting of substituted pyrazole, its salt and metallic complex thereof;

a second compound represented by dicyanodiamide; and a third compound selected from the group consisting of ammonium thiosulfate, biguanide and ammonium rhodanide, wherein the mixing ratio of the second compound to the third compound ranges from 4:1 to 1:4 and the mixing ratio of a combination of the second and third compounds to the first compound ranges from 35:1 to 5:1.

2. A method of inhibiting and controlling the nitrification of ammonium nitrogen in arable soils and substrates, comprising the step of applying to the soil an amount effective therefor of a composition including a first compound selected from the group consisting of substituted pyrazole, its salt and metallic complex thereof, a second compound represented by dicyanodiamide; and a third compound selected from the group consisting of ammonium thiosulfate, biguanide and ammonium rhodanide, wherein the mixing ratio of the second compound to the third compound ranges from 4:1 to 1:4 and the mixing ratio of a combination of the second and third compounds to the first compound ranges from 35:1 to 5:1.

3. The method of claim 2 wherein the composition is applied in the form of a solution, suspension, wettable powder or emulsion concentrate at a dosage of at least 1 kg of active ingredient per hectare.

4. The method of claim 2 wherein the applying step includes combining the composition with solid and liquid mineral and organic fertilizers selected from the group consisting of amide-containing fertilizers and ammonium-containing fertilizers for application.

5. The method of claim 2 wherein the applying step includes combining the composition with an agrochemical selected from the group consisting of herbicides, pesticides, growth regulators and soil-enrichment agents.

6. The method of claim 2, wherein the composition is applied with an amount of at least 0.5% related nitrogen content of a nitrogen containing mineral fertilizer.

* * * * *